(No Model.)
F. M. BLODGETT.
STETHOSCOPE.
No. 359,382. Patented Mar. 15, 1887.
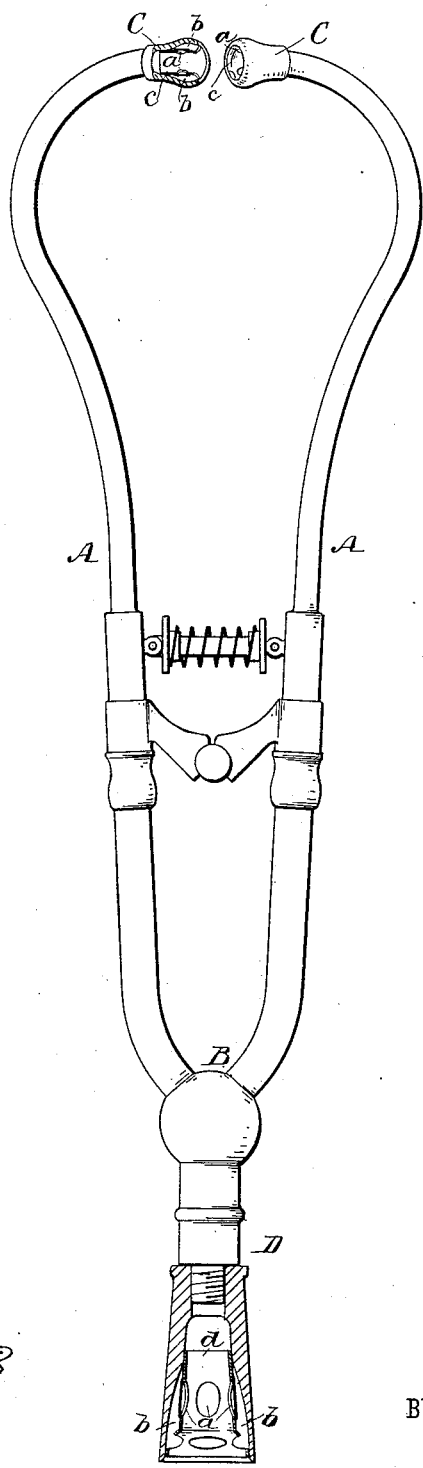
WITNESSES:
INVENTOR:
F. M. Blodgett
BY Munn & Co
ATTORNEYS.

UNITED STATES PATENT OFFICE.

FRANK M. BLODGETT, OF NEW YORK, N. Y.

STETHOSCOPE.

SPECIFICATION forming part of Letters Patent No. 359,382, dated March 15, 1887.

Application filed July 13, 1886. Serial No. 207,904. (No model.)

*To all whom it may concern:*

Be it known that I, FRANK M. BLODGETT, of the city, county, and State of New York, have invented a new and Improved Stethoscope, of which the following is a full, clear, and exact description.

My invention consists of the application to the interior walls of a stethoscope, and parallel therewith, or approximately so, of a sound-augmenting diaphragm, to improve the efficiency of the instrument, as hereinafter described and claimed.

Reference is to be had to the accompanying drawing, forming a part of this specification, in which the figure is a broken view of an ordinary stethoscope having my invention applied thereto.

$a$ represents the vibrator placed over a chamber, $b$. The vibrator may be a thin disk or diaphragm of metal, celluloid, rubber, animal tissue, or similar material. One or more of these may be arranged in the tubes A, or at the union B; but I prefer to apply them to the ear-tips C and the receiving-tube D. In the implement shown in the drawing each tip C is provided with four diaphragms; but a single one may be used, if desired. These are held, by preference, in a short metal tube or thimble, $c$, inserted in the tip, the chamber $b$ for each diaphragm being formed by enlarging the material of the tip, as shown.

In the receiving-tube D are placed one or more (preferably four) vibrators. These are held in a metal thimble, $d$, inserted in the tube, and the material of the tube is enlarged all about the thimble to form the chamber $b$.

By providing the implement with these diaphragms the sound-waves that enter the implement cause them to vibrate, so that they have a sounding-board effect and greatly augment the sound, and thus greatly improve the efficiency of the implement in detecting sounds within the human body.

Having thus described my invention, what I claim as new, and desire to secure by Letters Patent, is—

1. The receiver D, having connected to it the tubes A A, in combination with one or more vibrators arranged upon the interior of the receiver parallel, or nearly so, with the walls of the receiver and placed over a chamber, $b$, substantially as described.

2. The combination, with the receiver D and tubes A, connected thereto, of the tips C, provided each with one or more vibrators arranged parallel, or nearly so, with the walls of the tip, substantially as described.

3. The receiver D, tubes A A, and tips C, in combination with vibrators placed in the receiver and tips, and arranged parallel, or nearly so, with the walls of the receiver and tips, substantially as described.

FRANK M. BLODGETT.

Witnesses:
 GEO. C. T. SALOMON,
 H. A. WEST.